Figure 1:
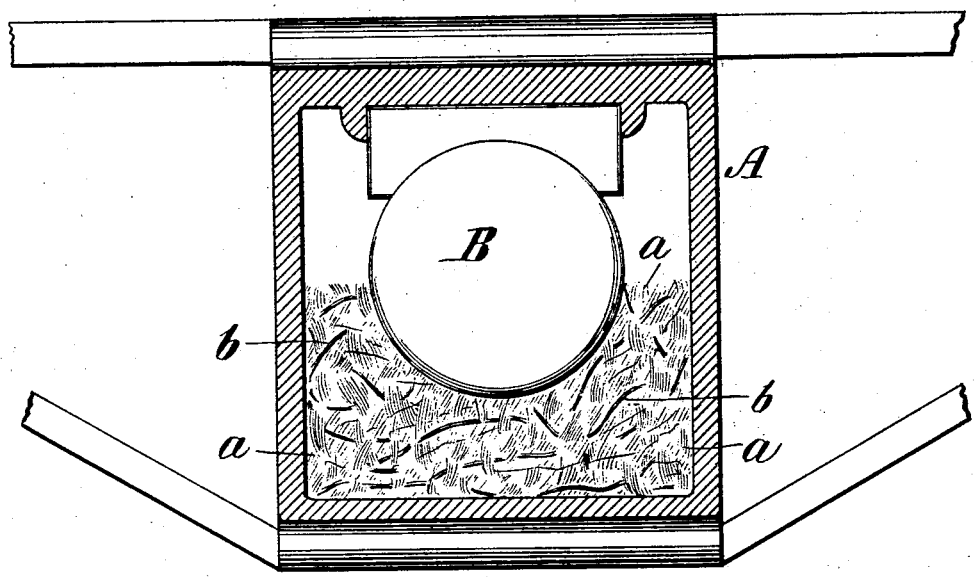

(No Model.)

E. B. JOHNSTON.
PACKING FOR JOURNAL BOXES.

No. 587,971. Patented Aug. 10, 1897.

WITNESSES:

Edward B. Johnston INVENTOR

BY

ATTORNEY

UNITED STATES PATENT OFFICE.

EDWARD B. JOHNSTON, OF FRANKLIN, PENNSYLVANIA, ASSIGNOR TO THE FRANKLIN MANUFACTURING COMPANY, LIMITED.

PACKING FOR JOURNAL-BOXES.

SPECIFICATION forming part of Letters Patent No. 587,971, dated August 10, 1897.

Application filed December 28, 1896. Serial No. 617,156. (No model.)

*To all whom it may concern:*

Be it known that I, EDWARD B. JOHNSTON, a citizen of the United States, and a resident of Franklin, in the county of Venango and State of Pennsylvania, have invented certain new and useful Packing for Journal-Boxes, of which the following is a specification.

My invention relates to a new and improved packing for journal-boxes, and has for its object a packing which is elastic, non-combustible, non-absorbent, and which will at the same time act as a prompt conductor of the lubricant to the surface of the journal. I accomplish this by a packing consisting of an elastic material, such as bamboo fiber, cocoa fiber, or other similar elastic material, and a non-combustible material which will at the same time act as a ready conductor of the lubricant to the journal, such as asbestos, mineral-wool, or other similar material.

The combination which I have found to produce the best results consists of bamboo fiber and asbestos fiber.

The two important functions of a journal-packing are to provide a conductor whereby the lubricant may be promptly and continuously conducted to the journal and means whereby such conductor may be held continually in contact with the journal.

In the packing herein described the asbestos fiber by capillary attraction conducts the lubricant along and across its fibers until it is brought in contact with the journal. The operation resembles that of a wick conveying oil to the flame, but differs therefrom in the respect that the lubricant does not saturate the asbestos, thereby rendering it heavy, soggy, and compact, as is the case where cotton, wool, sponge, or other absorbent material is used. The lubricant envelops and coats the fibers of the asbestos not being absorbed therein, and by capillary attraction draws the lubricant to the journal. My experiments have demonstrated that no other material when brought in contact with a lubricant will so nearly preserve its original light and fluffy quality. The asbestos is also non-combustible and will not be affected by the heating of the journal. It is also a poor conductor of heat, whereby the lubricant is presented to the journal at a low temperature.

The bamboo fiber, by reason of its springy, elastic, non-absorbent quality, imparts to the packing elasticity, checks the tendency of the asbestos when weighted with the lubricant to drop away from the journal to the bottom of the journal-box, and presents the asbestos fibers coated with the lubricant continuously to the surface of the journal.

I am aware that packing for journal-boxes composed of spongy absorbent materials designed to hold the lubricant in suspension, such as cotton and wool waste and sponge, has been used. The objections to such packing—namely, among others, that it is readily affected by the heat of the journal and that it quickly becomes sodden and compact and falls away from the journal—are overcome by my invention.

Reference is hereby made to the accompanying drawings, in which—

Figure 2:
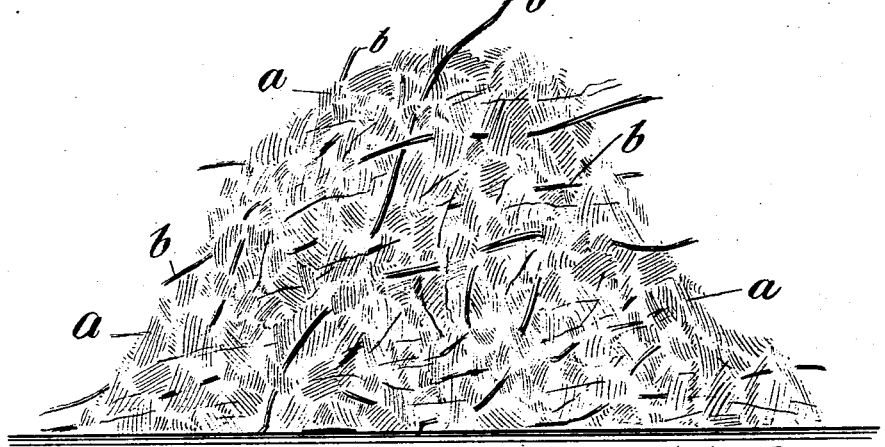

Figure 1 is a sectional view of the journal-box, showing the packing in place for use; and Fig. 2, a mass of the packing.

In the drawings, A represents the journal-box; B, the journal.

*a* is asbestos fiber or other non-absorbent and non-combustible material, and *b* is bamboo fiber or other elastic fibrous material.

I am also aware that a packing composed in part of asbestos or other similar material, such as plumbago, steatite, &c., has been used, but in such combination that the packing itself acts as a lubricant, and the only function of the asbestos, which in such case is and must be used as a powder, is its supposed aid as a lubricant, which I do not claim. Upon the contrary the packing herein described acts solely as a conduit for the lubricant to the journal.

What I claim, and desire to secure by Letters Patent, is—

1. A packing for journal-boxes, comprising a conductor for the lubricating-oil, non-absorbent and non-combustible in character, having intermingled therewith an elastic, fibrous material, said packing being retained in a fluffy and non-compressed state, for the purpose set forth.

2. A packing for journal-boxes, comprising a conductor for the lubricating-oil, non-absorbent and non-combustible in character, having intermingled therewith an elastic, fibrous, non-absorbent material, said packing being retained in a fluffy and non-compressed state, for the purpose set forth.

3. A packing for journal-boxes, comprising a conductor for the lubricating-oil, fibrous, non-absorbent and non-combustible in character, having intermingled therewith an elastic, fibrous, non-absorbent material, said packing being retained in a fluffy and non-compressed state for the purpose set forth.

4. A packing for journal-boxes, comprising elastic fiber and asbestos fiber, both said fibers being intermingled and retained in a fluffy and non-compressed state, for the purpose set forth.

5. A packing for journal-boxes, comprising bamboo fiber and asbestos fiber, both said fibers being intermingled and retained in a fluffy and non-compressed state.

Signed at Franklin, in the county of Venango and State of Pennsylvania, this 18th day of December, A. D. 1896.

EDWARD B. JOHNSTON.

Witnesses:
WILLARD A. BOURNE,
FRANK W. CUTTRELL.